United States Patent [19]
Wu et al.

[11] Patent Number: 6,069,286
[45] Date of Patent: May 30, 2000

[54] HYDROCARBON CONVERSION PROCESS EMPLOYING PROMOTED ZEOLITE CATALYST

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/116,449

[22] Filed: Jul. 16, 1998

[51] Int. Cl.$^7$ .............................. C07C 4/12; C10G 47/00
[52] U.S. Cl. .................. 585/485; 585/484; 208/111.01; 208/111.35
[58] Field of Search ...................... 585/418, 419, 585/486, 489, 484, 485; 208/111.01, 111.35

[56] References Cited

U.S. PATENT DOCUMENTS

| | | | |
|---|---|---|---|
| Re. 31,919 | 6/1985 | Butter et al. | 252/455 Z |
| 3,912,659 | 10/1975 | Brandenburg et al. | 252/455 Z |
| 4,053,369 | 10/1977 | Cines | 203/52 |
| 4,312,790 | 1/1982 | Butter et al. | 252/455 Z |
| 5,482,910 | 1/1996 | Bricker et al. | 502/300 |
| 5,609,752 | 3/1997 | Del Rossi et al. | 208/144 |
| 5,690,810 | 11/1997 | Lawrence et al. | 208/135 |

*Primary Examiner*—Walter D. Griffin
*Assistant Examiner*—Thuan D. Dang
*Attorney, Agent, or Firm*—Richmond, Hitchcock, Fish & Dollar

[57] ABSTRACT

A catalyst composition and a hydrocarbon conversion process are disclosed. The composition comprises a zeolite and a Group VIII metal. The process comprises contacting a fluid which comprises a hydrocarbon such as fuel oil and optionally a sulfur compound with the catalyst composition under a condition sufficient to effect the conversion of the hydrocarbon to benzene, toluene, a xylene, or combinations thereof. Also disclosed is a process for producing the catalyst composition which comprises contacting a zeolite with a Group VIII compound followed by heating the resulting Group VIII compound-containing zeolite under a reducing atmosphere.

11 Claims, No Drawings

HYDROCARBON CONVERSION PROCESS EMPLOYING PROMOTED ZEOLITE CATALYST

FIELD OF THE INVENTION

This invention relates to a catalyst composition useful in hydrocracking process, to a process for producing the composition, and to a process for using the composition in hydrocracking of a fuel oil.

BACKGROUND OF THE INVENTION

It is well known to those skilled in the art that aromatic hydrocarbons are a class of very important industrial chemicals which find a variety of uses in petrochemical industry. It is also well known to those skilled in the art that catalytically cracking gasoline range hydrocarbons produces benzene, toluene, xylenes, or combinations of two or more thereof which are hereinafter referred to as BTX or $C_6$ to $C_8$ aromatic hydrocarbons, in the presence of catalysts which contain a zeolite. The product of this catalytic cracking process contains a multitude of hydrocarbons including unconverted $C_5+$ alkanes, $C_5+$ alkenes, $C_5+$ cycloalkanes, or combinations of two or more thereof; BTX; lower alkanes such as methane, ethane, and propane; and lower alkenes such as ethylene and propylene.

In a fluidized catalytic cracking (FCC) process, one of the product fractions is fuel oil fraction which contains about over 90 weight % of polyaromatic compounds having 10 to about 25 carbon atoms per molecule. The fuel oil fraction generally has low value as compared to other petrochemicals, especially BTX. Therefore, it is highly desirable to convert fuel oil to benzene, xylenes, toluene, or combinations thereof.

Furthermore, the fuel oil generally comprises a sulfur compound. If a sulfur compound is not removed in a hydrocarbon conversion process, the sulfur compound will be in the product stream thereby decreasing the value of the hydrocarbon conversion product. Accordingly, there is a need to also reduce the sulfur content in a hydrocarbon conversion product.

Therefore, development of a catalyst and a process for improving the conversion of a hydrocarbon such as fuel oil, especially in the presence of a sulfur compound, to the more valuable benzene, a xylene, or combinations thereof would be a significant contribution to the art and to the economy.

SUMMARY OF THE INVENTION

An object of this invention is to provide a catalyst composition which can be used to convert a hydrocarbon such as fuel oil to benzene, a xylene, or combinations thereof in a hydrocracking process. Also an object of this invention is to provide a process for producing the catalyst composition. Another object of this invention is to provide a hydrocarbon conversion process which can employ the catalyst composition to convert a hydrocarbon such as fuel oil to benzene, toluene, xylenes, or combinations thereof. An advantage of the invention is that it enhances or improves the selectivity to BTX from a hydrocarbon such as fuel oil. Other objects and advantages will become more apparent as this invention is more fully disclosed hereinbelow.

According to a first embodiment of the present invention, a composition which can be used as a catalyst for converting a hydrocarbon such as fuel oil to benzene, toluene, xylenes, or combinations thereof is provided. The composition comprises, consists essentially of, or consists of, a zeolite having incorporated therein or impregnated thereon a promoter comprising at least one Group VIII metal. The term "Group VIII" refers to the CAS version of the Periodic Table of the Elements, CRC Handbook of Chemistry and Physics, 74th edition, 1993–1994, CRC Press, Boca Raton, Fla.

According to a second embodiment of the invention, a process for producing a composition which can be used as catalyst in a hydrocarbon conversion process is provided. The process can comprise, consist essentially of, or consist of: (1) optionally calcining a zeolite to produce a calcined zeolite; (2) contacting a zeolite or a calcined zeolite with a Group VIII compound, under a condition sufficient to incorporate the Group VIII compound into the zeolite to form a modified zeolite; and (3) heat-treating the modified zeolite under a reducing atmosphere to effect the production of a promoted zeolite.

According to a third embodiment of the present invention, a hydrocarbon process which can be used in the conversion of a hydrocarbon such as fuel oil is provided which comprises, consists essentially of, or consists of, contacting a fluid which comprises a hydrocarbon such as fuel oil, optionally sulfur dissolved in the fluid or a sulfur-containing compound, and further optionally in the presence of an inert fluid, with a catalyst composition which can be the same as disclosed above in the first embodiment of the invention under a condition effective to convert the hydrocarbon such as fuel oil to benzene, toluene, xylenes, or combinations thereof.

DETAILED DESCRIPTION OF THE INVENTION

According to the first embodiment of the invention, a composition which can be used as catalyst in a hydrocracking process for converting fuel oil to BTX is provided. The composition can comprise, consist essentially of, or consist of, a zeolite having incorporated therein, or impregnated thereon, a sulfur-reducing or yield-improving amount of a promoter to improve the yield of or selectivity to benzene, toluene, xylenes, or combinations thereof when the composition is used in a hydrocarbon conversion process. The term "improving" or "improve" is referred to, unless otherwise indicated, as an increased weight percent of, or percent selectivity to BTX which is defined earlier as benzene, toluene, xylenes, or combinations of two or more thereof in the product stream of a hydrocarbon process using the composition of the present invention, as compared to using a zeolite without a Group VIII metal or metal compound.

The term "hydrocarbon conversion" denotes conversion of a hydrocarbon or a mixture of hydrocarbons to a second hydrocarbon or a mixture of second hydrocarbons. The term "fuel oil" refers to a fraction of hydrocarbons produced in a fluid catalytically cracking of hydrocarbons. Generally a fuel oil comprises hydrocarbons having about 10 or more carbon atoms per molecule.

The term "metal" used herein refers to, unless otherwise indicated, both "metal" and "element" of the Periodic Table of the Elements because some elements in the Periodic Table of the Elements may not be considered as metals by those skilled in the art. The term "metal" also refers to a metal compound such as metal oxide. The term "Group VIII compound" refers to a compound of a Group VIII metal such as ruthenium nitrate.

According to the first embodiment of the invention, the weight ratio of Group VIII metal to zeolite can be any ratio so long as the ratio can improve the yield of or selectivity to BTX, in a hydrocarbon conversion process for producing benzene, toluene, xylenes, or combinations thereof. Generally, the ratio can be in the range of from about 0.0001:1 to about 1:1, preferably about 0.0005:1 to about 1:1, more preferably about 0.0005:1 to about 0.5:1 and most preferably from 0.001:1 to 0.1:1 for an effective hydrocarbon conversion. Alternatively, the Group VIII metal can be present in the catalyst composition in the range of from about 0.01 to about 50, preferably about 0.05 to about 50, more preferably about 0.05 to about 30, and most preferably 0.1 to 10 grams per 100 grams of the catalyst composition.

Any Group VIII metal that, when incorporated into a zeolite, is capable of substantially reducing the sulfur content or improving yield of BTX in a hydrocarbon conversion process can be employed in the invention. The term "substantially" refers to "more than trivial". Presently, it is preferred that the Group VIII metal comprises at least one Group VIII metal. The presently preferred Group VIII metal is ruthenium. The oxidation state of the metal can be any available oxidation state. If a combination of metals is employed, the molar ratio of the second metal, or the third metal, or the fourth metal, to the first metal can be in the range of about 0.01:1 to about 100:1.

Any commercially available zeolite which can catalyze the conversion of toluene to benzene, a xylene, or combinations thereof can be employed in the present invention. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," pages 58–59 (Butterworth-Heineman, Boston, Mass., 3rd ed. 1992). Optionally a zeolite can be steam- and/or acid-treated. The presently preferred zeolites are those having large pore size such as, for example, beta zeolite.

The composition of the present invention can be prepared by combining a zeolite, a Group VIII compound, and optionally a binder in the weight ratios or percent disclosed above under any conditions sufficient to effect the production of such a composition. However, it is preferred that the composition be produced by the process of the second embodiment of the present invention.

According to the second embodiment of the present invention, a zeolite, preferably zeolite, and optionally a binder can be well mixed at about 15 to about 100° C. under atmospheric pressure, generally in a liquid such as water, a solvent, or a hydrocarbon, by any means known to one skilled in the art such as stirring, blending, kneading, or extrusion, following which the resulting mixture can be dried in air at a temperature in the range of from about 20 to about 800° C., for about 0.5 to about 50 hours under any pressures that accommodate the temperatures, preferably under atmospheric pressure. Thereafter, the dried, zeolite-binder mixture can be further heat-treated at a temperature in the range of from about 200 to 1000° C., preferably about 250 to about 750° C., and most preferably 350 to 650° C. for about 1 to about 30 hours to prepare the present composition. The heat treatment can be carried out by air calcination or steaming.

Generally a zeolite, before a binder is combined with the zeolite, can also be calcined under similar conditions to remove any contaminants, if present, to prepare a calcined zeolite.

A zeolite, whether it has been steamed or not, can be treated with an acid before the preparation of the present composition. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to, sulfuric acid, hydrochloric acid, nitric acid, phosphoric acid, formic acid, acetic acid, oxalic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations of two or more thereof.

A zeolite, a calcined zeolite, or a calcined zeolite-binder mixture, whether it has been steamed or acid-treated, the process or treatment in the second embodiment is the same for each. For the interest of brevity, only a zeolite is described hereinbelow.

According to the second embodiment of the invention, a process for producing a zeolite-containing, preferably a beta zeolite-containing, composition comprises, consists essentially of, or consists of: (1) contacting a zeolite with a Group VIII compound under a condition sufficient to incorporate the Group VIII compounds into the zeolite to form a modified zeolite; and (2) heat-treating the modified zeolite under a condition to effect the production of a promoted zeolite.

In the second embodiment of the invention, a zeolite can be combined with a Group VIII compound by the process disclosed above for producing zeolite-binder mixture to produce the composition of the invention. The composition can also be produced by contacting a zeolite with a Group VIII compound, in a liquid such as solution or suspension, under a condition known to those skilled in the art to incorporate a promoter compound into the zeolite. An acid such as hydrochloric acid can also be used as liquid. Because the methods for incorporating or impregnating a promoter compound into a zeolite such as, for example, impregnation by incipient wetness method, are well known to those skilled in the art, the description of which is omitted herein for the interest of brevity.

Generally, in the process of the second embodiment of the invention, a zeolite can be combined with a Group VIII compound in any suitable weight ratios which would result in the weight ratios of a metal to zeolite disclosed in the first embodiment of the invention. Presently it is preferred that such combination be carried out in a suitable liquid, preferably an aqueous medium, to form an incipient wetness zeolite-Group VIII compound mixture. The combining of a zeolite and a Group VIII compound can be carried out at any temperature. Generally, the temperature can be in the range of from about 15° C. to about 200° C., preferably about 20° C. to about 180° C., and most preferably 20° C. to 150° C. under any pressure, preferably atmospheric pressure, for any length so long as the metal compound and the zeolite are well mixed, generally about 1 minute to about 100 hours, preferably about 1 minute to about 75 hours.

Any Group VIII compound can be used in the present invention. The presently preferred Group VIII compound is a ruthenium or platinum compound. Generally, any ruthenium compound that can promote the combination or incorporation of ruthenium element with a zeolite can be used in the invention. Examples of suitable ruthenium compounds include, but are not limited to, ammonium hexachlororuthenate, bis(cyclopentadienyl)ruthenium, chloropentaammineruthenium chloride, hexaammineruthenium chloride, ruthenium acetate, potassium pentachlororuthenate, ruthenium acetylacetonate, ruthenium bromide, ruthenium carbonyl, ruthenium chloride, ruthenium iodide, ruthenium nitrosyl chloride, ruthenium sulfite, and combinations of two or more thereof. The presently preferred ruthenium compound is ruthenium chloride.

Similarly, any platinum compound that can promote the combining of platinum element with a zeolite can be employed herein. Examples of suitable platinum compounds include, but are not limited to, chloroplatinic acid ($H_2PtCl_6 \cdot xH_2O$), platinum chloride (platinic chloride), platinum bromide, platinum iodine, tetramine platinum chloride ($Pt(NH_3)_4Cl_2 \cdot H_2O$ or $Pt(NH_3)_4Cl_2$), tetramine platinum nitrate ($Pt(NH_3)_4(NO_3)_2$), tetramine platinum hydroxide ($Pt(NH_3)_4(OH)_2$), tetrachlorodiamine platinum, and combinations of any two or more thereof. The oxidation state of platinum in the above-illustrated platinum compound can be any available oxidation state. The presently preferred platinum compound is chloroplatinic acid for it is readily available.

Examples of other suitable Group VIII compounds include, but are not limited to, cobalt(II) acetate, cobalt acetylacetonate, cobalt benzoylacetonate, cobalt bromide, cobalt carbonate, cobalt chloride, cobalt 2-ethylhexanoate, cobalt fluoride, cobalt iodide, cobalt 2,3-naphthalocyanine, cobalt nitrate, cobalt oxalate, cobalt perchlorate, cobalt phthalocyanine, cobalt sulfate, cobalt thiocyanate, cobalt tungstate, nickel acetate, nickel acetylacetonate, nickel bromide, nickel carbonate, nickel chloride, nickel nitrate, nickel perchlorate, nickel phosphide, nickel sulfate, nickel sulfide, nickel titanate, palladium acetate, palladium acetylacetonate, palladium bromide, palladium iodide, palladium nitrate, palladium sulfate, palladium sulfide, rhodium acetate, rhodium acetylacetonate, rhodium bromide, rhodium chloride, rhodium nitrate, rhodium octanoate, rhodium phosphate, rhodium sulfate, rhenium nitrate, rhenium sulfate, and combinations of any two or more thereof.

Upon completion of incorporating a Group VIII compound into a zeolite, a modified zeolite is formed. In the next step of the process, the modified zeolite is subject to a heat treatment. The heat treatment is carried out under a reducing atmosphere, i.e., without oxygen and in the presence of a reducing agent. Heat treatment can be carried out under a condition sufficient to convert a metal compound to its oxide or metal form and can include a temperature in the range of from about 250° C. to about 1000° C., preferably about 300° C. to about 750° C., and most preferably 350° C. to 650° C. under a pressure in the range of from about 1 to about 50 atmospheres for a period in the range of from about 0.1 to about 30, preferably about 0.1 to about 20, and most preferably 0.2 to 15 hours.

Steam treatment, if carried out under a reducing atmosphere, can be carried out under a suitable condition sufficient to effect the conversion of a Group VIII compound, which has been incorporated into the modified zeolite, to its corresponding oxide or metal form. The modified zeolite can be air dried to remove most moisture content before being steam-treated. Air drying can be carried out at a temperature for about 25° C. to about 150° C. for about 1 minute to about 30 hours under any effective pressure that can maintain the necessary temperature. The air-dried modified zeolite can then be treated with steam. Generally the steam temperature can be in any suitable vessel and in the range of from about 120° C. to about 1500° C., preferably about 200° C. to about 1200° C., and most preferably 250° C. to 1000° C. The treatment period can be as short as 5 minutes to as long as about 30 hours so long as it is sufficient to convert a metal compound to its oxide or metal form. The treatment can be carried out under a pressure which can maintain the required temperature and can be in the range of from about atmospheric pressure to about 50 atmospheres.

The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours. Other reducing agent can include CO, methane, or combinations thereof.

According to the third embodiment of the present invention, a process useful in hydrocarbon conversion comprises, consists essentially of, or consists of contacting a fluid stream comprising a hydrocarbon and, optionally in the presence of an inert fluid, with a catalyst composition under a condition sufficient to effect the conversion of a hydrocarbon to BTX. The inert fluid can be hydrogen, nitrogen, helium, argon, carbon dioxide, neon, steam, and combinations of any two or more thereof. The presently preferred inert fluid is a hydrogen-containing fluid such as hydrogen. The inert fluid can also be fed separately into contact with a hydrocarbon and a catalyst. The catalyst composition is the same as that disclosed in the first embodiment of the invention. The term "fluid" is used herein to denote gas, liquid, vapor, or combinations of two or more thereof. The presently preferred hydrocarbon feed comprises fuel oil as described hereinabove.

According to the invention, a feed stream comprising a hydrocarbon can also comprise sulfur or a sulfur compound in minor content. When a sulfur compound is present in the feed stream, the concentration of sulfur compound can be at least about 0.0001 weight %, preferably at least about 0.001 weight %, more preferably at least about 0.005 weight %, and most preferably at least about 0.01 weight % and can be less than about 1 weight %, preferably less than about 0.5 weight %, more preferably less than 0.1, and most preferably less than 0.05 weight % of sulfur. Any sulfur-containing compounds that are associated with a refining process can be present in the feed stream. Examples of sulfur compounds include, but are not limited to, hydrogen sulfide, thiophenes, thiophanes, thiophenols, sulfides, disulfides, mercaptans, mercaptides, carbonyl sulfide, and combinations of two or more thereof. The sulfur compounds commonly present in a hydrocarbon conversion process are thiophenes.

Any hydrogen-containing fluid which comprises, consists essentially of, or consists of, molecular hydrogen ($H_2$) can be used in the process of this invention. This hydrogen-containing fluid can therefore contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, steam, or combinations of two or more thereof, or any other fluid which does not significantly affect the process or the catalyst composition used therein.

Any fluid which contains a hydrocarbon can be used as the feed for the process of this invention. Generally, the fluid feed stream can also contain olefins, naphthenes (cycloalkanes), or some aromatic compounds.

The contacting of a fluid feed stream comprising a hydrocarbon with the catalyst composition can be carried out in any technically suitable manner, in a batch or semicontinuous or continuous process, under a hydrocarbon conversion condition effective to convert toluene to BTX. Generally, a fluid stream as disclosed above, preferably being in the vaporized state, is introduced into a suitable reactor having a fixed catalyst bed, or a moving catalyst bed, or a fluidized catalyst bed, or combinations of two or more thereof by any means known to one skilled in the art such as, for example, pressure, meter pump, and other similar means. Because a hydrocarbon conversion reactor is well known to one skilled in the art, the description of which is omitted herein for the interest of brevity. The condition can include a weight hourly space velocity (WHSV) of the fluid stream in the range of about 0.01 to about 100, preferably about 0.05 to about 50, and most preferably 0.1 to 30 g feed/g catalyst/hour. The gas hourly space velocity can be in the range of from about 0.01 to about 5000 $ft^3/ft^3$ catalyst/hour. Generally, the pressure can be in the range of from about 0 to about 1000 psig, preferably about 100 to about 800 psig, and most preferably 200 to 650 psig, and the temperature is about 250 to about 1000° C., preferably about 350 to about 750° C., and most preferably 450 to 650° C.

The process effluent (product) stream generally contains a light gas fraction comprising hydrogen, methane, ethylene, propylene, ethane, propane, non-aromatic compounds having greater than 3 carbon atoms; a BTX aromatic hydrocarbons fraction (benzene, toluene, ortho-xylene, meta-xylene and para-xylene); and a $C_9+$ fraction which contains aromatic compounds having 9 or more carbon atoms per molecule. Generally, the effluent can be separated into these principal fractions by any known methods such as, for example, fractionation distillation. Because the separation methods are well known to one skilled in the art, the description of which is omitted herein. The lights fraction can be fed to an aromatization reactor to be converted to aromatic hydrocarbons; methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can further undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), and isomerization of meta-xylene and/or ortho-xylene to para-xylene.

After the catalyst composition has been deactivated by, for example, coke deposition or feed poisons, to an extent that the feed conversion and/or the selectivity to the desired $C_6$–$C_8$ aromatic hydrocarbon(s) have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention using toluene as hydrocarbon feed and are not to be construed as unduly limiting the scope of the present invention. The examples illustrate the preparation of catalyst compositions of the invention and the use of the composition in a toluene disproportionation process.

EXAMPLE I

This example illustrates the preparation of a catalyst composition in accordance with this invention.

Catalyst A was an alumina-bound beta zeolite. It was produced as follows: 11.11 grams of a commercial beta zeolite (obtained from UOP Incorporated, Des Plaines, Ill., under the product designation BEA, in 1/16 inch extrudates) were mixed with 6.37 grams of 2 weight % $RuCl_3·3H_2O$ and 2 weight % HCl to produce a mixture. The mixture was heated at 125° C. for 64 hours to produce 11.15 g of Ru-impregnated zeolite catalyst ZZ. A portion (2.79 g) of which was then reduced at 450° C. in hydrogen gas for 30 minutes to produce 2.70 g of catalyst A. Catalyst A contained 0.467 weight % ruthenium.

A sample of 2.79 grams of catalyst ZZ was calcined in a muffle furnace (air) at 450° C. for 6 hours to produce 2.70 g of catalyst B. Catalyst B also contained 0.467 weight % Ru.

A portion (2.79 g) of catalyst ZZ was steamed in a U-shape tube at 450° C. for 6 hours to produce 2.68 g of catalyst C also containing 0.467 weight % Ru.

A portion (2.79 g) of catalyst ZZ was calcined in the presence of nitrogen without air at 450° C. for 6 hours to produce 2.67 g of catalyst D which contained 0.467 weight % ruthenium.

EXAMPLE II

This example illustrates the use of the catalyst compositions described in Example I as catalysts in a hydrocarbon process.

A stainless steel reactor tube (inner diameter: 1 centimeter; length: 60 centimeters) was filled with a bottom layer of 5 ml Alundum® alumina (inert, low surface area alumina), 2.65–2.77 grams of one of the catalysts in the middle layer, and a 5 ml top layer of Alundum® alumina. A liquid feed (density 0.865 g/ml) containing fuel oil, 1406 ppm thiophene (i.e., 500 parts by weight thiophene per million parts by weight feed), and 605 ppm nitrogen was introduced into the reactor at a rate of 5.0 ml/hour. Hydrogen gas was cofed as carrier gas at a rate of 15.6 liters per hour. The process was operated at a reaction temperature of about 400° C. and a pressure of about 800 psig. The feed composition is shown in Table I.

The fuel oil contained about 92 weight % aromatic compounds. The carbon number distribution of the fuel oil is as follows: $C_{10}$–$C_{13}$, 11.1 weight %; $C_{14}$–$C_{17}$, 48.7 weight %; and $C_{18}$–$C_{25}$, 40.2 weight %. The fuel oil had an initial boiling point of 176° C., a 5% point of 235.4° C. (the boiling point after 5% of oil was distillated), and a 50% point of 253° C. (the boiling point after 50% of oil was distillated).

The reactor effluent was separated into a gaseous phase and a liquid phase by passing it through a wet ice trap for liquid product collection and then through a wet test meter for gas volume measurement. The liquid product was analyzed by means of a Hewlett-Packard 5890 gas chromatograph using a HP-PLOT/alumina column. Pertinent test results, obtained after about 7 hours on stream, are summarized in Table I.

TABLE I[a]

| Catalyst | S | N | ΣC$_4$- | ΣC$_8$- | BTX |
|---|---|---|---|---|---|
| A | 362 | 13 | 23.8 | 65.9 | 36.3 |
| B | 750 | 6 | 3.3 | 13.1 | 2.8 |
| C | ND | ND | 2.7 | 6.6 | 1.5 |
| D | 683 | 38 | 7.8 | 27.7 | 9.9 |

[a]S denotes sulfur content (ppm by weight) in the product stream; N refers to nitrogen content (ppm by weight) in the product stream; ΣC$_4$- refers to weight % yield of hydrocarbons having 4 or less carbon atoms per molecule; ΣC$_8$- represents weight % yield of hydrocarbons having 8 or less carbon atoms per molecule; and BTX is the weight % yield of BTX.

The test data in Table I clearly show that catalyst A which was produced by the present invention produced significantly higher BTX over other catalysts. Other advantages of the invention include significantly higher reduction in sulfur content and nitrogen content in the product stream.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

What is claimed is:

1. A process for producing benzene, xylenes, toluenes and combinations thereof comprising contacting a fluid feed with a catalyst wherein the feed comprises polyaromatic compounds having about 10 to about 25 carbons per molecule and said catalyst is produced by the method which consists essentially of: (1) contacting a beta zeolite with a group VIII compound to produce a modified zeolite; and (2) heating said modified zeolite under a reducing atmosphere.

2. A process according to claim 1 wherein said Group VIII compound is a ruthenium compound.

3. A process according to claim 1 wherein said Group VIII compound is selected from the group consisting of ammonium hexachlororuthenate, bis(cyclopentadienyl)ruthenium, chloropentaammineruthenium chloride, hexaammineruthenium chloride, ruthenium acetate, potassium pentachlororuthenate, ruthenium acetylacetonate, ruthenium bromide, ruthenium carbonyl, ruthenium chloride, ruthenium iodide, ruthenium nitrosyl chloride, ruthenium sulfite, and combinations of two or more thereof.

4. A process according to claim 1 wherein said Group VIII compound is ruthenium chloride.

5. A process according to claim 1 wherein said heating is carried out in a hydrogen-containing fluid.

6. A process according to claim 3 wherein said heating is carried out in hydrogen.

7. A process according to claim 6 wherein said Group VIII compound is ruthenium chloride.

8. A process for producing benzene, xylenes, toluenes and combinations thereof comprising contacting a fluid feed with a catalyst wherein said feed comprises polyaromatic compounds having about 10 to about 25 carbons per molecule and said catalyst is produced by the method which consists essentially of: (1) contacting a beta zeolite with a group VIII compound to produce a modified zeolite; and (2) heating said modified zeolite in the absence of oxygen and in the presence of a reducing agent to produce a promoted zeolite.

9. A process according to claim 8 wherein said Group VIII compound is selected from the group consisting of ammonium hexachlororuthenate, bis(cyclopentadienyl)ruthenium, chloropentaammineruthenium chloride, hexaammineruthenium chloride, ruthenium acetate, potassium pentachlororuthenate, ruthenium acetylacetonate, ruthenium bromide, ruthenium carbonyl, ruthenium chloride, ruthenium iodide, ruthenium nitrosyl chloride, ruthenium sulfite, and combinations of two or more thereof; and said reducing agent is a hydrogen-containing fluid.

10. A process according to claim 8 wherein said Group VIII compound is ruthenium chloride and said reducing agent is hydrogen.

11. A process according to claim 10 wherein said feed further comprises a dissolved sulfur or a sulfur compound.

* * * * *